United States Patent
Fujimoto et al.

(10) Patent No.: US 7,300,393 B2
(45) Date of Patent: Nov. 27, 2007

(54) AUTOMATIC TOOL CHANGER

(75) Inventors: Akihiko Fujimoto, Yamanashi (JP); Naoki Sato, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/260,242

(22) Filed: Oct. 28, 2005

(65) Prior Publication Data

US 2006/0094575 A1   May 4, 2006

(30) Foreign Application Priority Data

Oct. 29, 2004 (JP) .............................. 2004-316392

(51) Int. Cl.
*B23Q 3/157* (2006.01)

(52) U.S. Cl. ............................ 483/56; 483/66; 483/39; 475/196

(58) Field of Classification Search ................. 483/39, 483/38, 54–56, 66–67; 475/196, 165, 168
See application file for complete search history.

(56) References Cited

U.S. PATENT DOCUMENTS

| 5,499,963 A | * | 3/1996 | Fujimoto et al. | ............. 483/56 |
| 5,577,423 A | * | 11/1996 | Mimura | ........................ 74/650 |
| 5,954,615 A | | 9/1999 | Folino | |
| 6,270,442 B1 | * | 8/2001 | Folino et al. | .................. 476/18 |

FOREIGN PATENT DOCUMENTS

| EP | 0 577 850 | 1/1994 |
| JP | 59-133863 | * 8/1984 |
| JP | 59183163 | 10/1984 |
| JP | 60205058 | 10/1985 |
| JP | 02015936 | 1/1990 |
| JP | 05203009 | 8/1993 |
| JP | 06000739 | 1/1994 |

OTHER PUBLICATIONS

European Search Report in corresponding EP Application No. 05256646.0-2302 dated Feb. 9, 2006.

* cited by examiner

*Primary Examiner*—Erica Cadugan
(74) *Attorney, Agent, or Firm*—Staas & Halsey LLP (57) ABSTRACT

An automatic tool changer in which the load produced when a turret is rotation-driven is reduced, and abrasion in the balls and the like of a speed reducer, and mal-distribution of an axial pressing force are prevented. The speed reducer that drives the turret in the automatic tool changer is constructed by superposing a driving plate, a holder, and a driven plate in the order named. In the driven plate fitted with tools, there is formed a ball groove in a concave-convex shape having the number of cycles corresponding to the number of the tools. In the driving plate, there is provided a ball groove obtained by enlarging the ball groove of the driven plate in the angular direction and copying two cycles. The holder is provided with a plurality of guide holes in the radial direction, which hold their respective balls. The driving plate is rotated by spindle rotation, and the driven plate is driven at a reduced speed of (the number of tools/2) through the balls. It is possible to reduce the load by setting the ball groove of the driven plate at the optimum pressure angle. The balls are dispersed, so that the axial pressure is even, to thereby reduce the abrasion of the balls and ball grooves, and the like.

10 Claims, 5 Drawing Sheets

AUTOMATIC TOOL CHANGER

BACKGROUND OF THE INVENTION

1. Field of the Invention

The present invention relates to an automatic tool changer for automatically changing a tool in a machine tool.

2. Description of Related Art

As a device for automatically changing a tool to be fixed to the spindle of a machine tool, an automatic changer, in which an impact generated during tool change is lessened, and the moving amount of a spindle head during tool change is reduced, was already developed by the applicant and has been well known (see JP6-739A).

Figure 1:
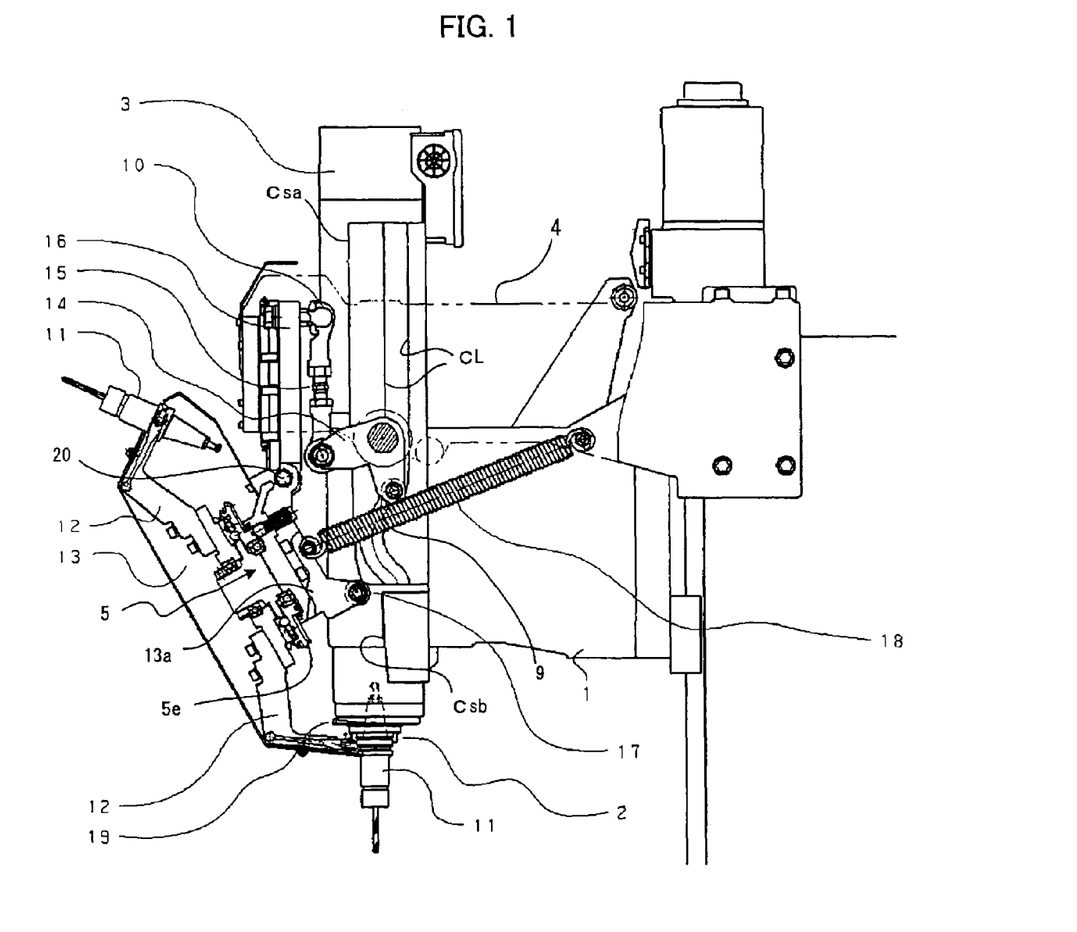
FIG. 1 is a schematic view of an automatic tool changer according to one embodiment of the present invention.

FIG. 1 is a schematic view of this automatic tool changer. The automatic tool changer has a vertically movable arm member 4, a turret 13 having a plurality of tool grippers 12 and holding tool holders 11 (tools). The turret 13 is provided with a speed reducer 5 for selecting a desired tool through the allocating operation, and the tool grippers 12 are so constructed as to rotate to be maintained in a tool change position due to the output of the speed reducer 5. A spindle 2 to which the tool holders (tools) 11 are fixed is rotatably supported by a spindle head 1.

The spindle head 1 has swing cams Csa and Csb for swinging the turret 13 in order to move each of the tool holders 11 held by the corresponding tool gripper 12 to a position where it is fixed to the spindle 2, and a lift cam CL for mounting and detaching the tool holder 11 with respect to the spindle 2 by moving the turret 13 up and down to move the corresponding tool gripper 12 in the vertical direction. The tool grippers 12 are fastened to a flange of a driven plate of the speed reducer disposed in the turret 13. Biasing means 18 is fixed in the middle portion of a turret base 13a with a fixing pin. One end of the turret base 13a is fixed to a turret slider 16 through a rotary shaft 20, and a swing roller 17 that cooperates with the swing cams Csa and Csb is rotatably fitted in the end portion on the opposite side of the rotary shaft 20. The biasing means 18 is fixed in the middle portion of the turret base 13a with the fixing pin, and the turret base 13a is biased anticlockwise around the rotary shaft 20. The swing roller 17 is so constructed as to be biased against cam faces of the swing cams Cs by the biasing means 18. With this structure, the swing roller 17 is supported by the swing cams Csa and Csb to be moved relatively on the swing cams Csa and Csb, to thereby swing the turret 13 according to the shapes of the swing cams Csa and. Csb.

The rotary shaft 20 is coupled to the turret slider 16. The turret slider 16 is constructed vertically movable along a linear guide, not shown, which is fixed to the arm member 4. A lift-adjusting member 15 is fixed to the other end of the turret slider 16 with a ball joint 10, and a lift lever 14 is fixed to the other end of the lift-adjusting member 15. The lift lever 14 is bent at an angle of about 90 degrees and is rotatably fitted to the arm member 4 at its bending point. A lift roller 9 engaged with the lift cam CL is rotatably fitted to the other end of the lift lever 14. In FIG. 1, reference numeral 3 represents a spindle motor for driving the spindle.

With the above-described structure, once a tool change command is given, the orientation of the spindle is carried out. At the same time, the spindle head 1 moves upward at fast speed, and the swing roller 17 moves on a flat supporting surface of the swing cam Csa (FIG. 1 shows a position where the spindle head 1 is raised. Before tool change operation is started, the spindle head 1 is in a descended position, whereas the turret 13 is positioned in an upper position in relation to the spindle head 1, and the swing roller 17 is positioned in an upper end portion of the swing cam Csa). The lift roller 9 moves in a straight-line portion of the lift cam CL, and the lift operation is not performed. Subsequently, due to the upward motion of the spindle head 1, the swing roller 17 moves in a curved portion of the swing cam Csa, thereby turning the turret base 13a anticlockwise around the rotary shaft 20 and beginning the swing motion of the turret 13. The tip end of the tool gripper 12 approaches a V-groove of the tool holder 11. After a roller provided to the tip end portion of the tool gripper 12 is engaged with the V-groove, the roller accurately moves on the V-groove.

Furthermore, due to the upward motion of the spindle head 1, the swing roller 17 moves to a flexion of the swing cam Csa and the swing cam Csb. Immediately before the swing motion therebetween is finished, the lift roller 9 is engaged with a flexion of the lift cam CL, thereby turning the lift lever 14 anticlockwise around the rotary shaft, moving the lift-adjusting member 15 and the turret slider 16 in the upward direction, and accelerating the turret base 13a, namely the turret 13, in the same direction with respect to the upward motion of the spindle head 1. As a result, when the swing motion is finished, due to the upward motion of the spindle head 1 and the lift operation of the turret 13, the relative speed becomes virtually zero, so that the impact is drastically reduced.

After the swing motion is finished, the spindle head 1 moves upward at fast speed, and simultaneously the turret 13 begins the lift operation for pulling out the tool holder 11 from the spindle. In other words, the swing roller 17 moves on the swing cam Csb, and the lift roller 9 moves from the top of the flexion of the lift cam CL in a descending direction. This makes the swing motion slight. Additionally, since the lift roller 9 moves in the opposite direction to the direction of moving to the top of the lift cam CL, the lift acceleration acts in the opposite direction, which slows down the upward lift operation. The downward lift operation is started. Due to the relative downward lift operation with respect to the spindle head 1, the tool holder 11 is pulled out from the spindle 2.

After the upward motion of the spindle head 1 is finished, a spindle gear 19 of the spindle 2 and a turret gear 5c of the speed reducer 5 are engaged with each other. The spindle 2 rotates to rotate the turret 13 through the speed reducer 5, to thereby carry out the allocation of the desired tool. After the turret-allocating operation is finished, the spindle head 1 descends in the inverse order to the above-mentioned order, and the tool change operation is completed.

Figure 5A:
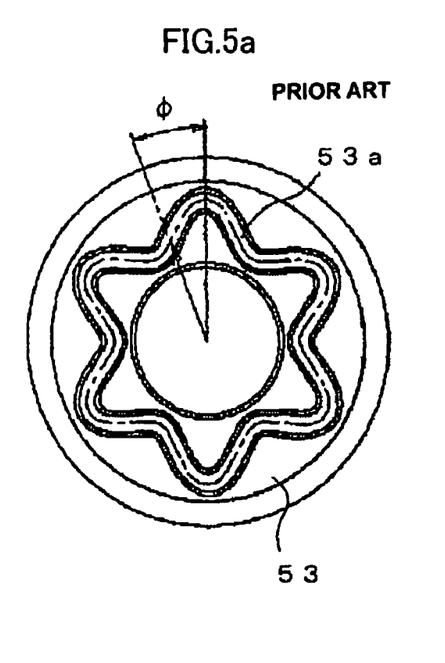
Figure 5B:
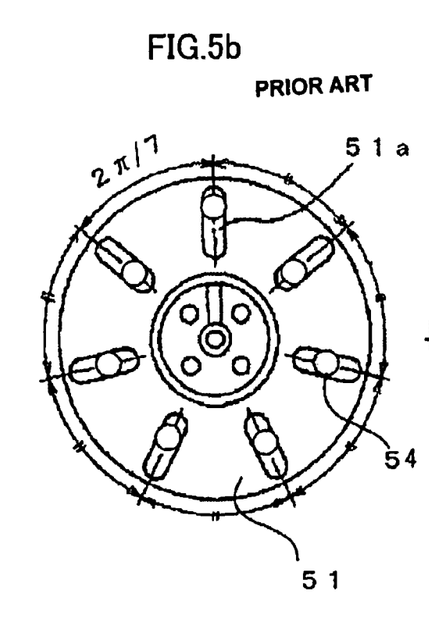
Figure 5C:
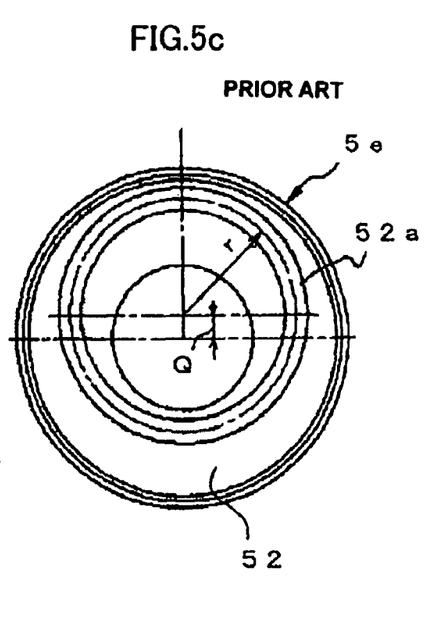

FIG. 5 are explanatory views of the speed reducer used in the above-described conventional automatic tool changer. The speed reducer is formed of a holder 51, a driving plate 52, and a driven plate 53. As shown in FIG. 5c, the driving plate 52 is provided with cogs in its circumferential surface to serve as a turret gear 5e. In the end face of the driving plate 52, a circular cam groove 52a with radius r is formed to be eccentric from the rotational center of the turret gear 5e by an eccentricity amount Q. In the holder 51, as shown in FIG. 5b, n+1 oval groove portions 51a extending longitudinally along the radial direction are arranged at regular angle intervals on the condition that the speed reduction ratio is n (n=2, 3, 4 . . . ). The examples illustrated in FIG. 5 show the case where the speed reduction ratio n equals 6. The longitudinal length of each of the oval groove portions 51a along an axis is twice or more as great as the eccentricity amount Q in the eccentric circular cam groove 52a of the driving plate 52. Balls 54 are held in the respective groove portions 51a. On the surface of the driven plate 53, as shown in FIG. 5a, there is provided a virtually circular member having a cam groove 53a in the shape of petals or a starfish including as many concaves and convexes as the speed reduction ratio n in the radial direction, engaging with the balls 54. The examples of FIG. 5 show the case where the speed reduction ratio is 6.

The driving plate 52 is rotatably fitted to the turret base 13a, and the holder 51 is fixed to the turret base 13a in a state superposed upon the driving plate 52. The oval groove portions 51a of the holder 51 are made to hold the respective balls 54, and the balls 54 and the cam groove 52a of the driving plate 52 are engaged with each other. Moreover, the driven plate 53 is fitted to the holder 51 to be rotatable and superposed thereupon. The cam groove 53a of the driven plate 53 and the balls 54 held by the holder 51 are engaged with each other. The tool grippers 12 are fixed to the driven plate 53.

While the driving plate 52 makes one rotation, the balls 54 make one reciprocating motion in the radial direction within the respective groove portions 51a of the holder 51 in the state engaged with the cam groove 53a of the driven plate. As to the motion of the balls 54 within the groove portions 51a, in the cam groove 53a of the driven plate 53, the balls 54 for example move from the top to the top and press the side faces of the cam groove 53a between the tops, to thereby move the driven plate 53 for one cycle of the cam groove 53a. In other words, since the number of concaves and convexes of the cam groove 53a is n, the driven plate 53 moves only by $2\pi/n$ with respect to a center angle $\phi$. Therefore, if the speed reduction ratio is 6, the driven plate 53 makes 1/6 rotation while the driving plate 52 makes one rotation, making it possible to obtain 1/6 speed reduction.

In the above-described conventional automatic tool changer, when the turret 13 is rotation-driven, the load is great, so that it is necessary to moderate the acceleration/deceleration. Furthermore, abrasion of the balls 54 of the speed reducer and a pressing force of the balls 54 are unevenly generated. As a result, there arises the problem that undulation occurs in the rotation of the turret.

As described, with the speed reducer used in the conventional automatic tool changer, the cam groove 52a formed in the driving plate 52 has the circular shape as shown in FIG. 5, so that the degree of freedom in design is small, and it is impossible to set a sufficiently small pressure angle. In order to decrease the pressure angle, the eccentricity amount Q of the cam groove 52a of the driving plate 52 is made large to increase the motion amount of the balls 54. By so doing, however, there generates an undercut in the cam groove 53a of the driven plate 53, or a curvature radius of the cam groove 53a of the driven plate 53 becomes extremely small. Therefore, the pressure angle should not be reduced. Due to the great pressure angle, the load created when the turret is rotation-driven is great, so that it is necessary to moderate acceleration/deceleration in order to smooth the turret rotation. Therefore, the tool change takes time.

Furthermore, because of the eccentricity of the cam groove 52a of the driving plate 52, the axial pressing force borne by each of the balls 54 becomes eccentric and uneven, so that the surface pressure borne by each of the balls is locally increased. As a result, the cam grooves 52a and 53a or balls abrade away, and occasionally do not last for a full duration of life. Moreover, since the balls 54 are unevenly distributed with respect to the surfaces of the driving plate 52 and the driven plate 53, due to deviation in the axial pressing force borne by each of the balls 54, there generates undulation during the rotation of the driving plate 52 due to the eccentricity of the axial pressing force borne by each of the balls 54. Consequently, when the spindle-side gear 19 and the turret gear 5e rotate in the state engaged with each other, a backlash in cog surfaces of the gears fluctuates, so that the backlash cannot be properly regulated. As a consequence, there is the problem of loud noises.

SUMMARY OF THE INVENTION

According to one aspect of the present invention, an automatic tool changer for a machine tool includes a speed reducer for reducing a rotational speed of a driving force for turning a plurality of tools to be changed. The speed reducer comprises; a driving plate to which the driving force is inputted, provided rotatably and having a ball-driving groove; a holder provided fixedly on a base of the speed reducer and having guide holds for respectively holding and guiding a plurality of balls movably in a radial direction by restricting circumferential motion of the plurality of balls; and a driven plate to which a tool-holding device for detachably holding the plurality of tools is fixed, provided rotatably and having a ball-driven groove. The driving plate, the holder and the driven plate are coaxially arranged such that the balls respectively held by the guide holes of the holder are engaged with the ball-driving groove of the driving plate and the ball-driven groove of the driven plate, thereby the driven plate is rotated by the driving force inputted to the driving plate. The ball-driven groove of the driven plate is defined by a continuous curved line having a plurality of cycles along a circumference of the driven plate, and the ball-driving groove of the driving plate is defined by a continuous curved line obtained by enlarging two or more cycles of the continuous curved line of the ball-driven groove of the driven plate in a circumferential direction thereof.

According to another aspect of the present invention, an automatic tool changer comprises: a first gear provided to be rotated with a spindle of a machine tool; a second gear brought into engagement with the first gear at the time of tool selection; and a tool-holding device for detachably holding a plurality of tools to be changed; a speed reducer arranged between the first gear and the tool-holding device, the speed reducer comprising; a driving plate provided rotatably with the second gear and having a ball-driving groove, a driven plate provided rotatably with the tool-holding device and having a ball-driven groove, and a holder fixedly provided between the driving plate and the driven plate and having guide holes for respectively holding and guiding a plurality of balls to be movable in a radial direction by restricting circumferential motion of the plurality of balls. The driving plate, the holder and the driven plate are coaxially arranged such that the balls respectively held by the guide holes of the holder are engaged with the ball-driving groove of the driving plate and the ball-driven groove of the driven plate, thereby rotary motion of the driving plate is converted into radial motion of the balls and then converted into rotary motion of the driven plate to be rotated with a reduced rotational speed. The ball-driven groove of the driven plate is defined by a continuous curved line having a plurality of cycles along a circumference of the driven plate, and the ball-driving groove of the driving plate is defined by a continuous curved line obtained by enlarging two or more cycles of the continuous curved line of the ball-driven groove of the driven plate in a circumferential direction thereof.

The number of cycles of the continuous curved line defining the ball-driven groove of the driven plate may correspond to the number of plurality of tools detachably held by the tool-holding device.

The continuous curved line defining the ball-driving groove of the driving plate is slightly enlarged in a radial direction with respect to an average radius of radial strokes of the ball-driven groove of the driven plate.

A ratio of a rotational speed of the driven plate to a rotational speed of the spindle may be set to a value obtained by dividing an integral multiple of the number of plurality tools detachably held by the tool-holding device by 2.

Paths of the ball-driving groove and the ball-driven groove may be partially biased in accordance with surface pressure produced on the paths between the driving plate and the driven plate.

The ball groove formed in the driven plate may be an arbitrary continuous curved line, and it is possible to set a sufficiently small pressure angle. Therefore, the load created during the turret driving can be reduced. This enables rapid acceleration/deceleration of the turret driving at the time of tool selection, which shortens the time for tool change. Since the ball groove is designed to have a plurality of cycles in one round of the driving plate. As a result, the balls equally bear the axial pressing force, which prevents abrasion of the ball grooves of both the driving and driven plates and of the balls, and improves durability. Furthermore, the balls are dispersedly positioned on the surfaces of the driving plate and the driven plate, so that the balls equally bear the axial pressing force, which prevents undulation in rotation of the turret gear. Consequently, the fluctuation of a backlash in the cog surfaces of the gears is suppressed, and it is possible to constantly retain a proper backlash and reduce the noise level during turret allocation.

BRIEF DESCRIPTION OF THE DRAWINGS

FIG. 3a to FIG. 3c are explanatory views showing a speed reduction principle of the speed reducer;

FIG. 4a to FIG. 4d are explanatory views showing the operation of the speed reducer; and FIG. 5a to FIG. 5c are explanatory views showing the operation of a speed reducer used in a conventional automatic tool changer.

DETAILED DESCRIPTION

The present invention is obtained by improving a speed reducer applied to an automatic tool changer shown in FIG. 1, and is an improvement of the speed reducer for causing a turret to make a reduced rotation.

According to the present invention, a construction of the automatic tool changer other than the speed reducer is identical to that of a conventional automatic tool changer, and the operation thereof is the same as that of the conventional automatic tool changer shown in FIG. 1, apart from an operating portion of the speed reducer. Therefore, FIG. 1 is a schematic view of an automatic tool changer according to one embodiment of the present invention at the same time.

Figure 2:
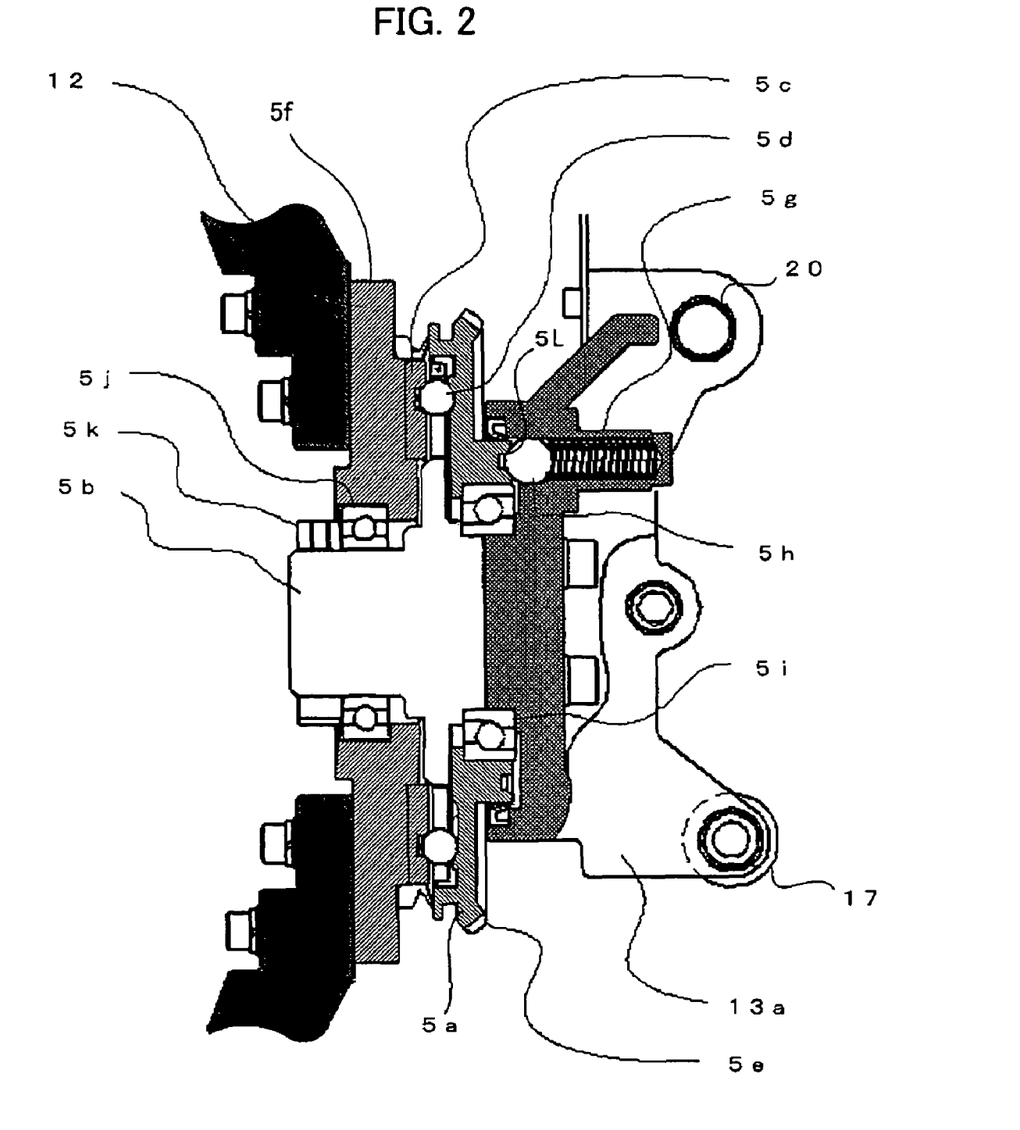
FIG. 2 is a partial sectional view of a speed reducer according to the same embodiment.

FIG. 2 is a partial sectional view of the speed reducer applied to the automatic tool changer according to the one embodiment of the present invention. A speed reducer 5 disposed in a turret 13 is formed of a driving plate 5a, a holder 5b, a driven plate 5c, and balls 5d. The driving plate 5a is rotatably fitted to a turret base 13a by using a bearing 5i, and the holder 5b is fixed to the turret base 13a. A flange 5f of the driven plate 5c constructing tool-holding means is rotatably fitted to an axis portion of the holder 5b by using a bearing 5j. The holder 5b is so fixed as to be sandwiched between the driving plate 5a and the driven plate 5c from both sides. As mentioned below, the balls 5d are held in guide holes provided to the holder 5b, and ball grooves formed in the driving plate 5a and the driven plate 5c are engaged with the balls.

Cogs are formed in a circumferential surface of the driving plate 5a, thereby constructing a turret gear 5e engaged with a spindle gear 19 provided to a spindle 2. Between the turret base 13a and the driving plate 5a, a positioning ball 5h for positioning the driving plate 5a in a tool change position is so disposed as to press the driving plate 5a with a spring 5g. In the driving plate 5a, there are formed hollows 5L in positions for engaging with the positioning ball 5h so that the positioning is carried out each time the driving plate 5a makes ½ rotation.

A plurality of tool grippers 12 are fitted to the flange 5f formed integrally with the driven plate 5c. In short, the flange 5f forms the tool-holding means. Reference character 5k represents a nut for holding the bearing 5j.

Figure 3A:
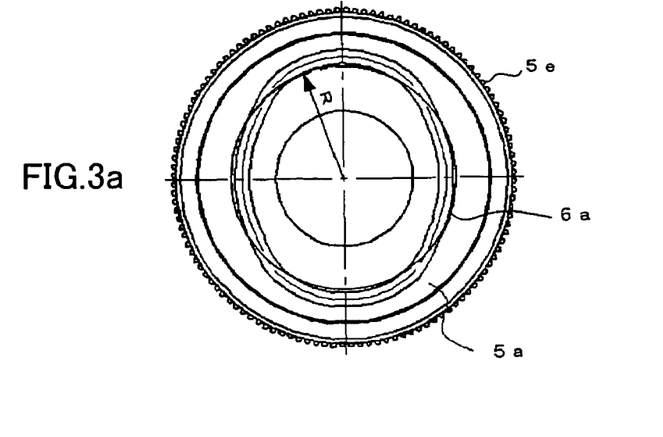
Figure 3B:
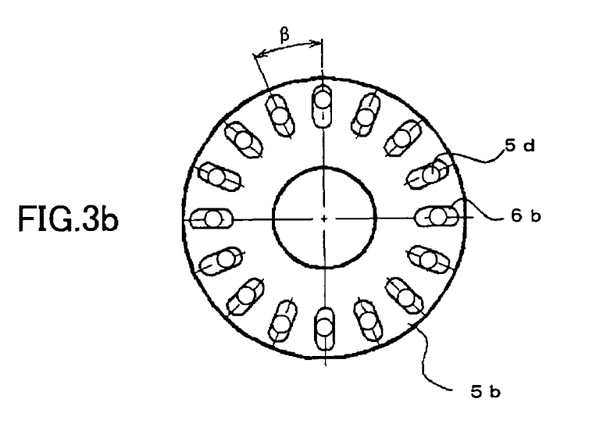
Figure 3C:
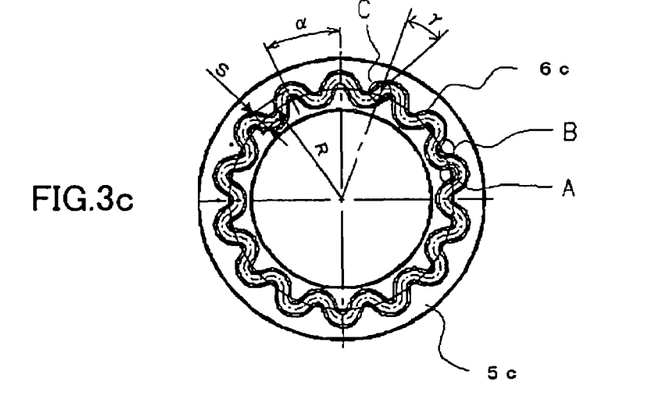

FIG. 3a is a plan view of the driving plate 5a, FIG. 3b is a plan view of the holder 5b, and FIG. 3c is a plan view of the driven plate 5c.

In this embodiment, the number of tools is 14. A gear ratio between the spindle gear 19 and the turret gear (driving plate 5a) 5e is 1:2, and a speed ratio between the driving plate 5a and the driven plate 5c of the speed reducer 5 is 7:1.

First, the driven plate 5c will be described. In an end face of the driven plate 5c, there is formed a ball groove 6c that is engaged with the balls 5d and forms a cam groove. The ball groove 6c is made up of a groove formed into a continuous curved line having cycles in the concave-convex shape like sine waves in a radial direction in a state where a circle with an average radius R is positioned at the center. The ball groove 6c is formed so that inner corners of the ball groove 6c, shown by reference characters A and B in FIG. 3c, are not extremely small convex bent portions, and so that an area shown by reference character C in the drawing may have a minimum pressure angle that is sufficiently small (30 degrees or less). In this embodiment, the turret is capable of holding the 14 tools. Therefore, according to the number of the tools, the concaves/convexes of the ball groove 6c of the driven plate 5c is a continuous curved line repeating 14 cycles (1 cycle α=360 degrees/14) in one round of the driven plate 5c.

In this embodiment, as shown in FIG. 3b, the holder 5b is provided with guide holes 6b radially arranged in positions determined by dividing 360 degrees into 16 equal parts, so as to stretch in a radial pattern. The balls 5d are fitted into the respective guide holes 6b. The balls 5d are restrained in circumferential motion, and are movable only in the radial direction. The number of the guide holes 6b that can be disposed in the holder 5b is (the number of cycles of the ball groove 6a in one rotation of the driving plate 5a)×(the required speed ratio+1). In this embodiment, the number of cycles of the ball groove 6a in one rotation of the driving plate 5a is 2, and the speed reduction ratio of the speed reducer is 7, so that the equation, 2×(7+1)=16, is established. Needless to say, even if some of the guide holes 6b are thinned out after disposition, the equation can be established in principle.

The driving plate 5a is also provided with the ball groove 6a forming a cam groove. In this embodiment, the speed ratio between the spindle gear 19 and the turret gear 5e is 2:1. The ball groove 6a of the driving plate 5a is a virtually oval-shaped curved line which is obtained by enlarging two or more cycles of the ball groove 6c of the driven plate that are enlarged by an amount, seven times larger, for example, in an angular direction. The amount the ball groove 6c is enlarged is determined based on the set speed ratio between the driving plate 5a and the driven plate 5c of the speed reducer 5. In short, the ball groove 6a has a cam-curved line with two cycles corresponding to one round of the driving plate 5a. As mentioned, two conical hollows are formed in a back surface of the driving plate 5a such that they are positioned each time the driving plate 5a makes ½ rotation, and the ball 5h is biased with the spring 5g.

Moreover, in the present embodiment, the ball groove 6a of the driving plate 5a is enlarged in the radial direction to be greater than the shape obtained by enlarging a set number of cycles of the ball groove 6c of the driven plate 5c by seven times, for example, in the angular direction. When the average radius R of radial strokes is taken as the center, and the average R and a radial distance of the ball groove 6c of the driven plate 5c are enlarged and copied to be about 1.03 times larger, for example, this creates a state where the balls 5d are in tighter contact with the concave portions of the ball groove 6c of the driven plate 5c. This makes it possible to further reduce the surface pressure produced in the convex portions A and B of the ball groove 6c of the driven plate 5c.

In other words, according to the present invention, the ball groove 6c of the driven plate 5c is formed in a waved shape including the number of concaves and convexes, which is obtained by multiplying the number of cycles of the ball groove of the driving plate 5a by the speed ratio required in the speed reducer so that the ball groove 6c has a desired pressure angle (ideal pressure angle) γ. Subsequently, the ball groove 6c of the driven plate 5c is slightly enlarged in the radial direction with the average radius R of the radial strokes of the ball groove 6c in the driven plate 5c at the center, and is also enlarged to be several times (seven times in the embodiment) larger in the angular direction, to thereby obtain the shape of the ball groove 6a of the driving plate 5a in order to be matched with the shape of the ball groove 6c of the driven plate 5c. As described, the present invention is characterized in that the desired pressure angle γ is first decided to determine the shape of the ball groove 6c of the driven plate 5c, and the ball groove 6a of the driving plate 5a is formed to be matched with the shape of the ball groove 6c of the driven plate 5c, which makes it possible to carry out the driving at the desired pressure angle.

At the time of allocating the tools, when the turret gear 5e is engaged with the spindle gear 19, and the driving plate 5a having the turret gear 5c is rotated by rotation of the spindle 2, the balls 5d held in the respective guide holes 6b of the holder 5b receive a force from the ball groove 6a of the driving plate 5a. However, since the circumferential motion thereof is restrained by the guide holes 6b, they move in the radial direction. Due to the radial motion of the balls 5d, the ball groove 6c of the driven plate 5c receives the force on concave-convex waved side surfaces (a portion shown by reference character C in FIG. 3c) of the ball groove 6c, to thereby rotate the driven plate 5c. The flange (tool-holding means) 5f formed integrally with the driven plate 5c also rotates together. This rotates the tool grippers 12 fitted with the flange (tool-holding means) 5f. Since the ball groove 6c of the driven plate 5c is set to have the ideal small pressure angle γ, the load created when the turret is driven is reduced.

FIG. 4 show a state in which the driven plate 5c, the holder 5b and the balls 5d according to the embodiment are disposed, and each of the balls 5d moves while the driven plate 5c moves through a rotation angle between two adjacent tools in order to allocate one of the tools.

Figure 4A:
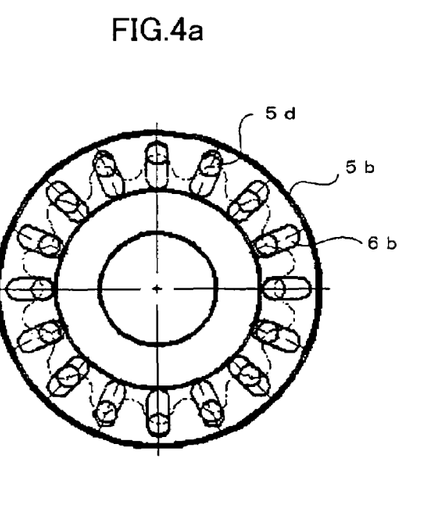
Figure 4B:
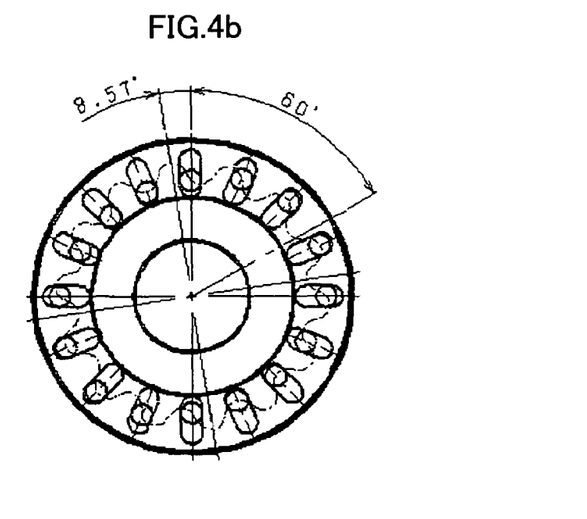
Figure 4C:
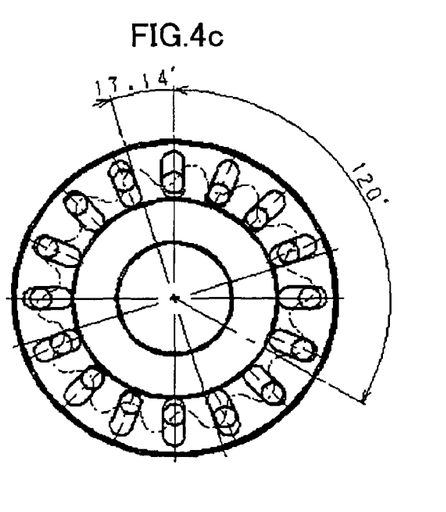
Figure 4D:
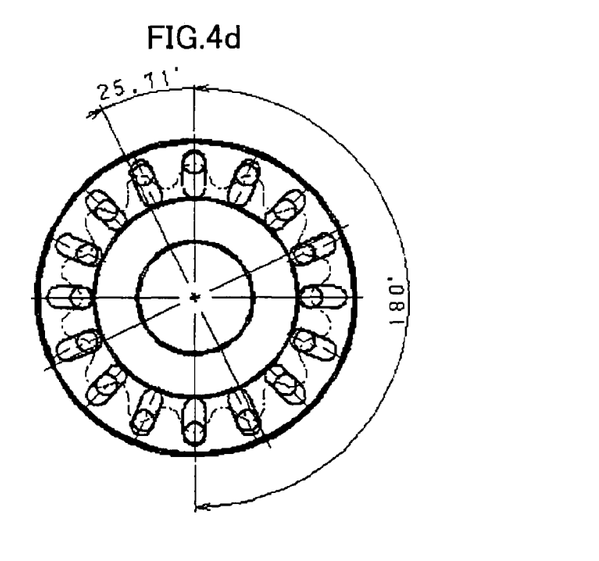

FIG. 4a shows a state in which the motion is started, FIG. 4b shows a state in which the driven plate 5c moves through ⅓ cycle (one cycle α=360/14, and α/3=8.57 degrees), FIG. 4c shows a state in which the driven plate 5c moves through ⅔ cycle (=17.14 degrees), and FIG. 4d shows a state in which the driven plate 5c moves through one cycle (α=25.71 degrees).

In FIG. 4, along with the rotation of the driving plate 5a, the disposition of the balls 5d is rotated by a sevenfold moving amount in a rotating direction opposite to the driven plate 5c because of the oval-shaped ball groove 6a. While the driven plate 5c rotates through an angle of 25.71 degrees corresponding to an angle between two adjacent tool grippers 12, the oval-shaped ball disposition is rotated at an angle of 180 degrees. In other words, the driving plate 5a makes a half rotation, and the half rotation of the driving plate 5a causes the motion only through the angle between the tool grippers 12 fitted to the flange (tool-holding means) 5f of the driven plate 5c.

In the embodiment described above, with respect to the 14 tools on the turret 13, the speed ratio between the spindle gear 19 and the turret gear 5e is 2:1, and the speed ratio between the driving plate 5a and the driven plate 5c is 7:1. As a result, the speed ratio between the spindle and the turret is 14:1. In other words, the driving plate 5a makes ½ rotation each time the spindle makes one rotation, and the driven plate 5c makes a 360/14=25.71 degree rotation due to ½ rotation of the driving plate 5a, to thereby allocate one of the tools.

Although in the above embodiment, the rotational speed ratio of the turret (driven plate 5c) to the speed of the spindle 2 is 14:1, the speed ratio is not limited to this. To be brief, an object is to complete the positioning of the spindle into a phase where the tool can be held at the point when the allocation of the turret is finished. Therefore, the tool holder can be fixed to the spindle in a phase where keys in two places of the end surface of the spindle and key grooves formed in two places of a tool flange portion are matched with each other. Accordingly, if it is not necessary to recreate two sides of the phase of the tool to be held by the spindle, it is possible to set the speed ratio to be half with respect to the 14 tool holders 11 on the turret 13, that is to say, 7:1, and it is also possible to set a greater speed ratio.

To be specific, a tool position can be allocated by setting the rotational speed of the turret (driven plate 5c) to be 1, and setting the rotational speed of the spindle 2 to be a value equal to the number found by dividing an integral multiple of the number of the tool grippers (the number of the tools) provided to the turret by 2. To put it the other way around, the driven plate 5c should be designed to make a (2/an integral multiple of the number of the tools) rotation while the spindle makes one rotation. If this is formularized, assuming that the value by which the number of the tools is multiplied is X, the number of rotations Y of the turret (driven plate 5c) should be set to correspond to a rotation of the following equation 1 with respect to one spindle rotation.

$$Y = 2/\text{the number of tools} \times X \quad (1)$$

For example, correspondence between the practicable number of tools and the speed ratio between the spindle and the turret can be organized as below.

Where the number of tools is 10, the speed ratio is:
5:1, 10:1, 15:1, 20:1 . . .
Where the number of tools is 14, the speed ratio is:
7:1, 14:1, 21:1, 28:1 . . .

Where the number of tools is 21, the speed ratio is:
21:2, 21:1, 42:3, 42:1 . . .

Formed in the driven plate 5*c* is the ball groove 6*c* in the concave-convex shape in which the number of cycles equals (the number of cycles of the ball groove of the driving plate)×(the speed ratio required in the speed reducer). Provided in the driving plate 5*a* is the ball groove 6*a* having the shape obtained by enlarging the ball groove 6*c* of the driven plate 5*c* to be (the speed ratio required in the speed reducer) times larger in the angular direction and copying the same. Formed in the holder 5*b* are the guide holes 6*b* as many as (the number of cycles of the ball groove 6*a* of the driving plate 5*a*)×(the speed ratio required in the speed reducer+1).

The Case Where the Number of Tools is 10, and the Speed Ratio is 5:1

Let us say that the speed ratio between the spindle gear 19 and the turret gear 5*e* is 2:1. In the driven plate 5*c*, there is formed the ball groove 6*c* in the shape concave-convex having (the number of cycles of the ball groove of the driving plate=2)×(the speed ratio required in the speed reducer=2.5)=5 cycles. In the driving plate 5*a*, there is provided the ball groove 6*a* (2 cycles) having the shape obtained by enlarging the ball groove 6*c* of the driven plate 5*c* to be (the speed ratio required in the speed reducer=2.5) times larger in the angular direction and copying the same. In the holder 5*b*, there are formed the guide holes 6*b* as many as (the number of cycles of the ball groove of the driving plate=2)×(the speed ratio required in the speed reducer+1=3.5)=7.

In this example, the spindle 2 makes five rotations, and the turret (driven plate 5*c*, tool-holding means 5*f*) makes one rotation. While the spindle makes one rotation, the turret (driven plate 5*c*, tool-holding means 5*f*) makes ⅕ rotation. Every time the spindle makes one rotation, the driving plate 5*a* makes ½ rotation. Due to the ball groove 6*a*, the balls 5*d* are caused to make one reciprocation and moved through one cycle of a concave-convex cycle of the ball groove 6*c* of the driven plate 5*c*, to thereby cause the turret (driven plate 5*c*, tool-holding means 5*f*) to make ⅕ rotation.

The Case Where the Number of Tools is 10, and the Speed Ratio is 10:1

Let us say that the speed ratio between the spindle gear 19 and the turret gear 5*e* is 2:1. In the driven plate 5*c*, there is formed the ball groove 6*c* in the concave-convex shape having (the number of cycles of the ball groove of the driving plate=2)×(the speed ratio required in the speed reducer=5)=10 cycles. In the driving plate 5*a*, there is provided the ball groove 6*a* (2 cycles) having the shape obtained by enlarging the ball groove 6*c* of the driven plate 5*c* to be (the speed ratio required in the speed reducer=5) times larger in the angular direction and copying the same. In the holder 5*b*, there are formed the guide holes 6*b* as many as (the number of cycles of the ball groove of the driving plate=2)×(the speed ratio required in the speed reducer+1=6)=12.

The turret (driven plate 5*c*, tool-holding means 5*f*) is caused to make 1/10 rotation while the spindle makes one rotation. Since the speed ratio between the spindle gear 19 and the turret gear 5*e* is 2:1, while the spindle makes one rotation, the driving plate 5*a* makes ½ rotation to rotate for one cycle of the ball groove 6*a*, thereby causing the balls 5*d* to make one reciprocation, moving the balls 5*d* through one cycle of the concave-convex cycle of the ball groove 6*c* of the driven plate 5*c*, and causing the turret (driven plate 5*c*, tool-holding means 5*f*) to make 1/10 rotation.

The Case Where the Number of Tools is 10, and the Speed Ratio is 15:1

Let us say that the speed ratio between the spindle gear 19 and the turret gear 5*e* is 2:1. In the driven plate 5*c*, there is formed the ball groove 6*c* in the concave-convex shape having (the number of cycles of the ball groove of the driving plate=2)×(the speed ratio required in the speed reducer=7.5)=15 cycles. In the driving plate 5*a*, there is provided the ball groove 6*a* (2 cycles) having the shape obtained by enlarging the ball groove 6*c* of the driven plate 5*c* to be (the speed ratio required in the speed reducer=7.5) times larger in the angular direction and copying the same. In the holder 5*b*, there are formed the guide holes 6*b* as many as (the number of cycles of the ball groove of the driving plate=2)×(the speed ratio required in the speed reducer+1=8.5)=17. While the spindle 2 makes 15 rotations, the turret (driven plate 5*c*, tool-holding means 5*f*) makes one rotation. Each time the spindle makes one rotation, the turret (driven plate 5*c*, tool-holding means 5*f*) is caused to make 1/15 rotation. Since the driving plate 5*a* makes ½ rotation to rotate for one cycle of the ball groove 6*a* of the driving plate 5*a* while spindle makes one rotation, the balls make one reciprocation and move for one cycle of the concave-convex cycle of the ball groove 6*c* in the driven plate 5*c*. Accordingly, the turret (driven plate 5*c*, tool-holding means 5*f*) is caused to make 1/15 rotation. Similarly, while the spindle makes 1.5 rotation, the driven plate is caused to make 1/10 rotation corresponding to one tool.

The Case Where the Number of Tools is 14, and the Speed Ratio is 7:1

Let us say that the speed ratio between the spindle gear 19 and the turret gear 5*e* is 2:1. In the driven plate 5*c*, there is formed the ball groove 6*c* in the concave-convex shape having (the number of cycles of the ball groove of the driving plate=2)×(the speed ratio required in the speed reducer=3.5)=7 cycles. In the driving plate 5*a*, there is provided the ball groove 6*a* (2 cycles) having the shape obtained by enlarging the ball groove 6*c* of the driven plate 5*c* to be (the speed ratio required in the speed reducer=3.5) times larger in the angular direction and copying the same. In the holder 5*b*, there are formed the guide holes 6*b* as many as (the number of cycles of the ball groove of the driving plate=2)×(the speed ratio required in the speed reducer+1=4.5)=9.

While the spindle 2 makes 7 rotations, the turret (driven plate 5*c*, tool-holding means 5*f*) makes one rotation. Therefore, every time the spindle makes one rotation, the turret (driven plate 5*c*, tool-holding means 5*f*) is caused to make ⅐ rotation. Since the driving plate 5*a* makes ½ rotation to rotate for one cycle of the ball groove 6*a* every time the spindle makes one rotation, the balls are caused to make one reciprocation and move for one cycle of the concave-convex cycle of the ball groove 6*c* in the driven plate 5*c*, and the turret (driven plate 5*c*, tool-holding means 5*f*) is caused to make ⅐ rotation.

The same applies to the case in which the number of tools is 21, so that descriptions will be omitted.

In the above embodiment, the number of cycles of the driven plate 5*c*, which is enlarged and copied to the driving plate 5*a*, is 2. However, the concave-convex cycle of the driven plate 5*c* may be enlarged and copied such that the number of cycles to be copied to the driving plate 5*a* is an integral value.

For example, in case that the number of tools is 21, that the speed ratio between the spindle 2 and the turret (driven plate 5*c*, tool-holding means 5*f*) is 21:1, and that the number of cycles of the driving plate is 3, the speed ratio between the spindle gear 19 and the turret gear 5*e* is 3:1. In the driven plate 5*c*, there is formed the ball groove 6c in the concave-convex shape having (the number of cycles of the ball groove of the driving plate=3)×(the speed ratio required in the speed reducer=7)=21 cycles. In the driving plate 5a, there is provided the ball groove 6a (3 cycles) having the shape obtained by enlarging the ball groove 6c of the driven plate 5c to be (the speed ratio required in the speed reducer=7) times larger in the angular direction and copying the same. In the holder 5b, there are formed the guide holes 6b as many as (the number of cycles of the ball groove of the driving plate=3)×(the speed ratio required in the speed reducer+1=8)=24.

While the spindle 2 makes 21 rotations, the turret (driven plate 5c, tool-holding means 5f) makes one rotation. Therefore, each time the spindle makes one rotation, the turret (driven plate 5c, tool-holding means 5f) is caused to make $\frac{1}{21}$ rotation. While the spindle makes one rotation, the driving plate 5a makes $\frac{1}{3}$ rotation to rotate for one cycle of the ball groove 6a of the driving plate 5a, so that the balls are caused to make one reciprocation and move for one cycle of the concave-convex cycle of the ball groove in the driven plate 5c, and the turret (driven plate 5c, tool-holding means 5f) is caused to make $\frac{1}{21}$ rotation.

As described above, by determining the number of cycles of the ball groove 6c of the driven plate 5c, which is copied to the driving plate 5a, the speed reduction ratio in the speed reducer 5 is determined. Based on the speed reduction ratio, the speed reduction ratio between the spindle 2 and the speed reducer 5 (speed reduction ratio between the spindle gear 19 and the turret gear 5e), which is an input to the speed reducer 5 to be the final speed reduction ratio of the turret 13 (driven plate 5c, tool-holding means 5f) with respect to the spindle 2, may be determined.

What is claimed is:

1. An automatic tool changer for a machine tool, including a speed reducer for reducing a rotational speed of a driving force for turning a plurality of tools to be changed, said speed reducer comprising:

a driving plate to which the driving force is inputted, provided rotatably and having a ball-driving groove;

a holder provided fixedly on a base of the speed reducer and having guide holes for respectively holding and guiding a plurality of balls movably in a radial direction with respect to an axis perpendicular to a face of the holder by restricting circumferential motion of the plurality of balls; and a driven plate to which a tool-holding device for detachably holding the plurality of tools is fixed, provided rotatably and having a ball-driven groove, said driving plate, said holder and said driven plate being coaxially arranged such that the balls respectively held by the guide holes of said holder are engaged with the ball-driving groove of said driving plate and the ball-driven groove of said driven plate, thereby said driven plate is rotated by the driving force inputted to said driving plate, wherein the ball-driven groove of said driven plate is defined by a continuous curved line having a plurality of cycles along a circumference of the driven plate, and the ball-driving groove of said driving plate is defined by a continuous curved line obtained by enlarging two or more cycles of the ball-driven groove in an angular direction by an amount corresponding to a set speed ratio for the speed reducer.

2. An automatic tool changer according to claim 1, wherein the number of cycles of the continuous curved line defining the ball-driven groove of said driven plate corresponds to the number of plurality of tools detachably held by said tool-holding device.

3. An automatic tool changer according to claim 1, wherein the continuous curved line defining the ball-driving groove of said driving plate is enlarged in a radial direction with respect to an average radius of radial strokes of the ball-driven groove of said driven plate.

4. An automatic tool changer according to claim 1, wherein a ratio of a rotational speed of said driven plate to a rotational speed of the spindle is set to a value obtained by dividing an integral multiple of the number of plurality tools detachably held by said tool-holding device by 2.

5. An automatic tool-holding device according to claim 1, wherein the balls engaged with paths of the ball-driving groove and the ball-driven groove are biased in accordance with surface pressure produced on the paths between said driving plate and said driven plate.

6. An automatic tool changer for a machine tool having a spindle, comprising:

a first gear provided to be rotated with the spindle;

a second gear brought into engagement with said first gear at the time of tool selection; and a tool-holding device for detachably holding a plurality of tools to be changed;

a speed reducer arranged between said first gear and said tool-holding device, said speed reducer comprising: a driving plate provided rotatably with said second gear and having a ball-driving groove, a driven plate provided rotatably with said tool-holding device and having a ball-driven groove, and a holder fixedly provided between said driving plate and said driven plate and having guide holes for respectively holding and guiding a plurality of balls to be movable in a radial direction with respect to an axis perpendicular to a face of the holder by restricting circumferential motion of the plurality of balls, said driving plate, said holder and said driven plate being coaxially arranged such that the balls respectively held by the guide holes of said holder are engaged with the ball-driving groove of said driving plate and the ball-driven groove of said driven plate, thereby rotary motion of said driving plate is converted into radial motion of said balls and then converted into rotary motion of said driven plate to be rotated with a reduced rotational speed with respect to a rotational speed of the driving plate, wherein the ball-driven groove of said driven plate is defined by a continuous curved line having a plurality of cycles along a circumference of said driven plate, and the ball-driving groove of said driving plate is defined by a continuous curved line obtained by enlarging two or more cycles of the ball-driven groove in an angular direction by an amount corresponding to a set speed ratio for the speed reducer.

7. An automatic tool changer according to claim 6, wherein the number of cycles of the continuous curved line defining the ball-driven groove of said driven plate corresponds to the number of plurality of tools detachably held by said tool-holding device.

8. An automatic tool changer according to claim 6, wherein the continuous curved line defining the ball-driving groove of said driving plate is enlarged in a radial direction with respect to an average radius of radial strokes of the ball-driven groove of said driven plate.

9. An automatic tool changer according to claim 6, wherein a ratio of a rotational speed of said driven plate to a rotational speed of the spindle is set to a value obtained by dividing an integral multiple of the number of plurality tools detachably held by said tool-holding device by 2.

10. An automatic tool-holding device according claim 6, wherein the balls engaged with paths of the ball-driving groove and the ball-driven groove are biased in accordance with surface pressure produced in the paths between said driving plate and said driven plate.

* * * * *